(12) United States Patent
Wilkinson et al.

(10) Patent No.: US 10,431,030 B2
(45) Date of Patent: *Oct. 1, 2019

(54) DOCKING STATION WITH REMOVABLE LOCKERS

(71) Applicant: Walmart Apollo, LLC, Bentonville, AR (US)

(72) Inventors: Bruce W. Wilkinson, Rogers, AR (US); Todd D. Mattingly, Bentonville, AR (US); Brian G. McHale, Chadderton Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,503

(22) Filed: Jul. 9, 2018

(65) Prior Publication Data

US 2018/0330562 A1 Nov. 15, 2018

Related U.S. Application Data

(63) Continuation of application No. 15/815,344, filed on Nov. 16, 2017, now Pat. No. 10,049,519.
(Continued)

(51) Int. Cl.
*G07C 9/00* (2006.01)
*G06Q 20/18* (2012.01)

(52) U.S. Cl.
CPC ..... *G07C 9/00896* (2013.01); *G07C 9/00571* (2013.01); *G06Q 20/18* (2013.01);
(Continued)

(58) Field of Classification Search
CPC ............ G07C 9/00896; G07C 9/00571; G07C 9/00563
(Continued)

(56) References Cited

U.S. PATENT DOCUMENTS 6,323,782 B1   11/2001   Stephens
6,688,435 B1    2/2004   Will
(Continued)

FOREIGN PATENT DOCUMENTS

CN          204044930          12/2014

OTHER PUBLICATIONS

"Contico Storage Locker"; http://www.walmart.com/ip/Contico-Storage-Locker/2476189; pp. 1-6.
(Continued)

*Primary Examiner* — Allen T Cao
(74) *Attorney, Agent, or Firm* — Fitch, Even, Tabin & Flannery LLP

(57) ABSTRACT

In some embodiments, apparatuses, and methods are provided pertaining to lockers that can be secured in a docking station. In some embodiments, a system comprises a docking station, the docking station configured to selectively secure and release one or more lockers and receive a command to allow one of the one or more lockers to be released, wherein each of the one or more lockers is removable from the docking station, and wherein each of the one or more lockers comprises a storage portion and a securement mechanism for securing each of the one or more lockers to the docking station.

19 Claims, 4 Drawing Sheets

Related U.S. Application Data

(60) Provisional application No. 62/422,794, filed on Nov. 16, 2016.

(52) U.S. Cl.
CPC ............ *G07C 9/00563* (2013.01); *G07C 2009/00634* (2013.01)

(58) Field of Classification Search
USPC ................................. 340/5.5–5.55
See application file for complete search history.

(56) References Cited

U.S. PATENT DOCUMENTS

| | | |
|---|---|---|
| 6,882,269 B2 | 4/2005 | Moreno |
| 7,268,666 B2 | 9/2007 | Fassbender |
| 9,244,147 B1 | 1/2016 | Soundararajan |
| 2002/0116289 A1 | 8/2002 | Yang |
| 2009/0240575 A1 | 9/2009 | Bettez |
| 2013/0144428 A1 | 6/2013 | Irwin |
| 2014/0316918 A1 | 10/2014 | Zaniker |
| 2014/0354403 A1 | 12/2014 | Zaniker |
| 2015/0186840 A1 | 7/2015 | Torres |
| 2016/0027261 A1 | 1/2016 | Motoyama |
| 2017/0069154 A1* | 3/2017 | Hilton ................ G07C 9/00182 |

OTHER PUBLICATIONS

PCT; App. No. PCT/US2017/061958; Interbational Search Report and Written Opinion dated Feb. 6, 2018.

\* cited by examiner

DOCKING STATION WITH REMOVABLE LOCKERS

CROSS-REFERENCE TO RELATED APPLICATION

This application is a continuation of U.S. application Ser. No. 15/815,344, filed Nov. 16, 2017, which claims the benefit of U.S. Provisional Application No. 62/422,794, filed Nov. 16, 2016. All of the above-noted applications are all incorporated by reference in their entirety herein.

TECHNICAL FIELD

This invention relates generally to storage devices and, more particularly, storage devices that are secured by a docking station.

BACKGROUND

Oftentimes, people may find it convenient to have a storage device to hold their belongings. For example, a traveler may find it convenient to have a storage device to secure his or her belongings, or to carry his or her belongings while traversing a public transit facility such as an airport. As another example, a shopper living in a city who does not own a vehicle may find it convenient to have a storage device capable of carrying purchased items, such as groceries, from the store to his or her home. While a traveler may be able to rent a cart while traversing the airport and a shopper may be able to utilize a cart while in a store, these solutions have drawbacks. With regard to the traveler, he or she must return the cart before boarding a plane or leaving the airport. With regard to the shopper, he or she must return the cart when leaving the store property. In both cases, the traveler and shopper are forced to contend with their items and purchases without the aid of a cart at some point.

BRIEF DESCRIPTION OF THE DRAWINGS

Disclosed herein are embodiments of systems, apparatuses, and methods pertaining to lockers that can be secured in a docking station. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein pertaining to lockers that can be secured in a docking station. In some embodiments, a system comprises a docking station, the docking station configured to selectively secure and release one or more lockers and receive a command to allow one of the one or more lockers to be released, wherein each of the one or more lockers is removable from the docking station, and wherein each of the one or more lockers comprises a storage portion and a securement mechanism for securing each of the one or more lockers to the docking station.

As previously discussed, many people may find it convenient to have access to a storage device to secure and/or carry their items. While a traveler may be able to utilize a cart while in the airport to carry his or her luggage and a shopper may be able to utilize a cart while on store property, the traveler and shopper are both left managing their belongings unaided at times. Consequently, a need exists for a system that allows people to utilize a storage device to aid in transport of their belongings. Some embodiments described herein seek to provide a storage device that can help people transport their belongings. In one embodiment, a locker system exists in which lockers are secured in a docking station. People can retrieve lockers from the docking station and use the lockers to transport their belongings. The discussion of FIG. 1 provides an overview of one such system.

Figure 1:
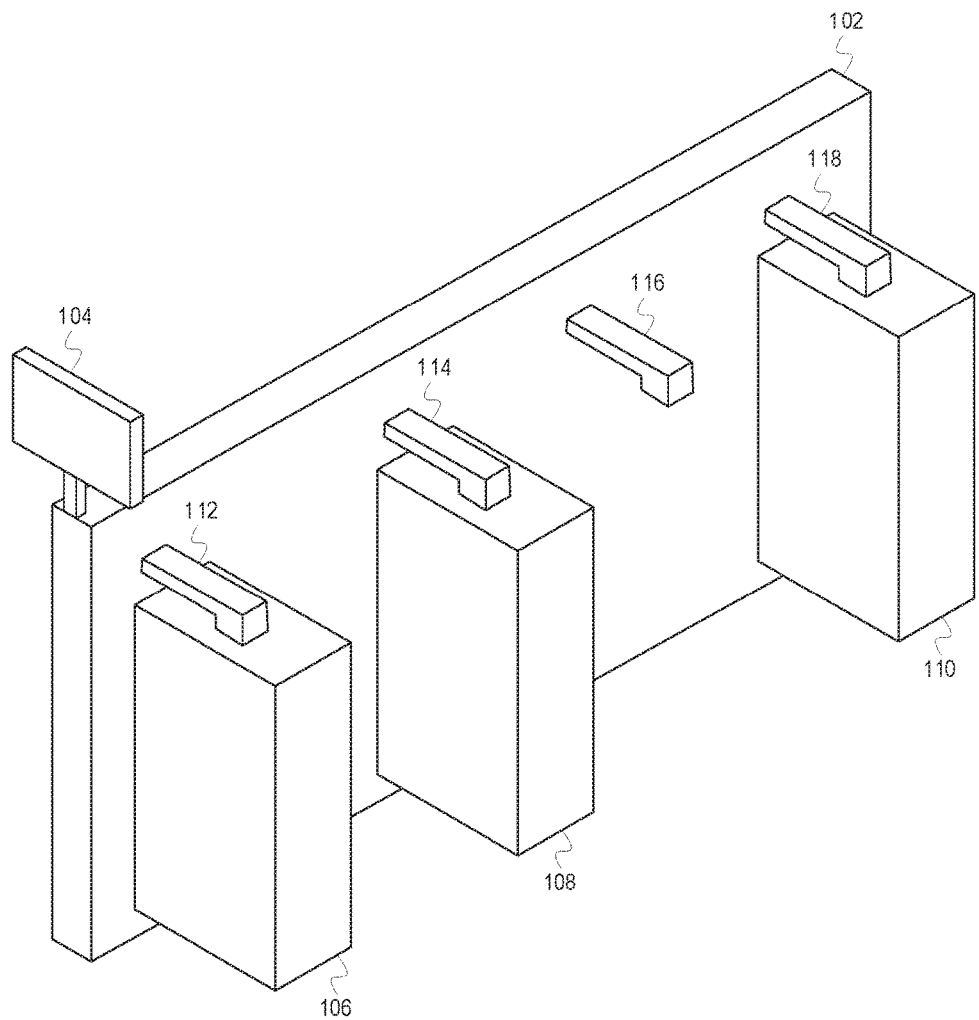
FIG. 1 depicts a docking station 102 securing multiple lockers, according to some embodiments.

FIG. 1 depicts a docking station 102 securing multiple lockers, according to some embodiments. The docking station 102 includes a securement mechanism which secures the lockers to the docking station 102. For example, as depicted in FIG. 1, the docking station 102 includes four securement mechanisms: a first securement mechanism 112, a second securement mechanism 114, a third securement mechanism 116, and a fourth securement mechanism 118. FIG. 1 depicts three lockers: a first locker 106, a second locker 108, and a fourth locker 110. Each of the securement mechanisms is associated with one of the lockers. Specifically, the first securement mechanism 112 is associated with the first locker 106, the second securement mechanism 114 is associated with the second locker 108, and the fourth securement mechanism 118 is associated with the fourth locker 110. Note that a locker (not pictured) has been removed from the docking station 102 and that the third securement mechanism 116 would be associated with this removed locker.

In some embodiments, the docking station 102 also includes a control device 104 which allows people to retrieve a locker from the docking station 102. For example, a person can use the control device 104 to rent or reserve a locker. The control device 104 can include a display device (e.g., a LCD/LED/CRT screen with or without touch capabilities) and present a graphical user interface (GUI). In some embodiments, the control device 104 can also include a payment mechanism. In such embodiments, a person can rent or reserve a locker, as well as pay for use of the locker, at the docking station 102. In some embodiments, the docking station 102 includes a communications device. In such embodiments, a person can rent or reserve a locker remotely (i.e., while physically distant from the docking station 102) via a computer or mobile device. After a person rents or reserves a locker, the docking station 102 can transmit a command to release the locker. In some embodiments, the docking station selects which locker to release, while in other embodiments, the person can select which locker to release. For example, after renting or reserving a locker, the control device 104 can present a code to the person. The person can then enter the code at a station associated with a locker of his or her choosing or select a locker via the control device 104. As one example, the person can choose the first locker 106. After entering the code at a station associated with the first locker 106 or selecting the first locker 106 via the control device 104, the docking station 102 can transmit a command to the first securement mechanism 112 to release the first locker 106. The person can then remove the first locker 106 from the docking station 102. In some embodiments, the docking station 102 can be one of many docking stations. In such embodiments, the person may be able to return the first locker 106 to any of the many docking stations. The many docking station can be located throughout a geographic area (e.g., a neighborhood, city, state, country, etc.). In the case of travelers, airports across the country can include the many docking stations.

As an alternative, or in addition to, renting lockers, in some embodiments, people may own a locker. In such embodiments, the person can store his or her locker at the docking station 102 (or any other docking station) as is convenient and for easy retrieval.

Figure 2:
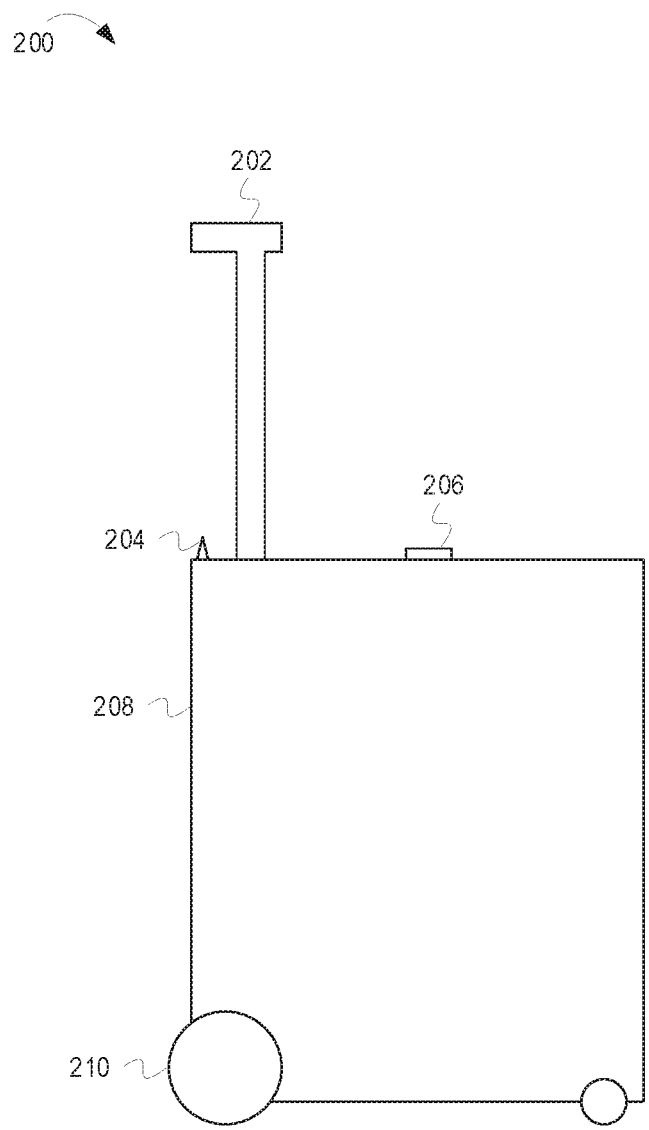
FIG. 2 depicts a locker 200 that is capable of being secured in a docking station, according to some embodiments.

While the discussion of FIG. 1 provides an overview of a docking station from which people can rent or reserve lockers, the discussion of FIG. 2 provides greater detail about lockers that can be rented or reserved from a docking station.

FIG. 2 depicts a locker 200 that is capable of being secured in a docking station, according to some embodiments. The locker 200 includes a handle 202, a storage portion 208, wheels 210, and securement portion 206. In some embodiments, as is the case with the locker 200 depicted in FIG. 2, the locker 200 can also include an antenna 204. A person can guide or pull the locker 200 via the handle 202. In some embodiments, the locker 200 includes a propulsion unit that can drive the wheels 210 for example, via a drive mechanism. The propulsion unit can be powerful enough to move the locker 200, or can simply provide assistance to the person in pulling or pushing the locker 200. If the locker 200 includes a propulsion unit, the locker 200 can also include a battery or other energy store. In such embodiments, the docking station can be configured to charge the battery when the locker 200 is secured in the docking station. Additionally, the locker 200 may be configured to connect to a power supply in the person's car. In such embodiments, the person's car can charge the locker 200.

The storage portion 208 is capable of holding the person's belongings. In some embodiments, the storage portion 208 can be condition-controlled. For example, the locker 200 can include a condition control device that maintains the temperature, humidity, etc. inside the storage portion 208. In some embodiments, the storage portion 208 can also be locked. That is, a door of the locker 200 can be locked. The storage portion 208 can be locked with a traditional key mechanism or with an electronic lock. In the case of an electronic lock, the locker 200 can include a validation mechanism that allows the person to unlock the storage portion 208. For example, the validation mechanism can be a user input (e.g., a keypad or touchscreen), a biometric device, or a near field communication ("NFC") reader. In some embodiments, the validation mechanism can also cause the wheels 210 to be locked to prevent movement of the locker 200 by unauthorized persons. As one example, the validation mechanism can be a biometric device located in the handle 202. When the person holds the handle 202, the validation mechanism can unlock the wheels 210, assuming the person is an authorized person.

The securement portion 206 allows a securement mechanism of the docking station to secure the locker 200 when the locker 200 is docked at the docking station. The securement portion 206 can take any suitable form. For example, the securement portion 206 can be a physical mechanism (e.g., a latch, clip, etc.) or an electronic mechanism (e.g., an electromagnet). The docking station can transmit commands to the securement mechanism or the securement portion 206 to release the locker 200 from the docking station (i.e., allow the locker 200 to be removed from the docking station).

As previously discussed, in some embodiments, the locker 200 can include an antenna 204. The antenna 204 can be connected to a communications device to allow the locker 200 to transmit messages. For example, the locker 200 can transmit messages to the docking station or a backend. Additionally, in some embodiments, the locker 200 can include a network adapter. In such embodiments, the locker 200 may be able to provide connectivity to the person. For example, the network adapter can be an access point that broadcasts a Wi-Fi signal. In such embodiments, the person may be able to connect to the Wi-Fi signal.

Figure 3:
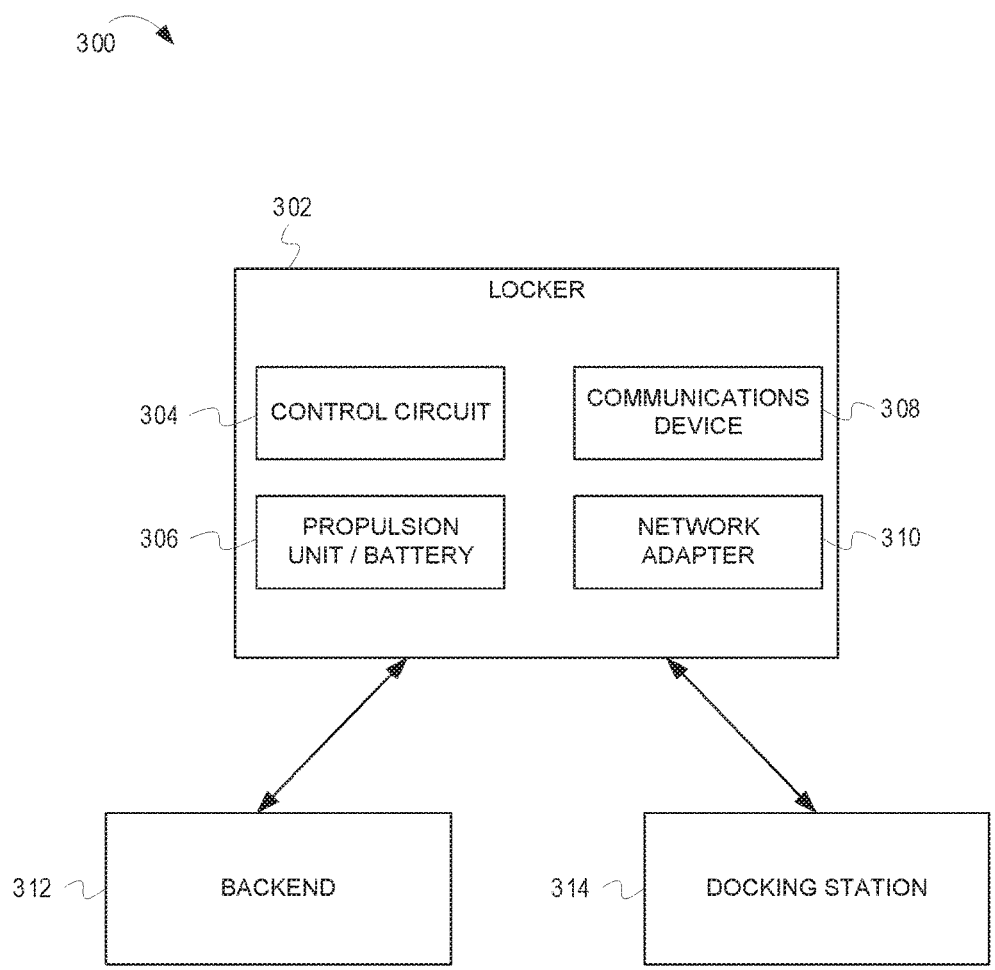
FIG. 3 is a block diagram of a system 300 including a locker 302, a docking station 314, and a backend 312 according to some embodiments.

While the discussion of FIG. 2 provides greater detail about a locker, the discussion of FIG. 3 provides additional detail about a system including the locker, a docking station, and a backend.

FIG. 3 is a block diagram of a system 300 including a locker 302, a docking station 314, and a backend 312, according to some embodiments. The locker 302 includes a control circuit 304. The control circuit 304 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 304 is configured (for example, by using corresponding programming as will be well understood by those skilled in the art) to carry out one or more of the steps, actions, and/or functions described herein.

By one optional approach the control circuit 304 operably couples to a memory. The memory may be integral to the control circuit 304 or can be physically discrete (in whole or in part) from the control circuit 304 as desired. This memory can serve, for example, to non-transitorily store the computer instructions that, when executed by the control circuit 304, cause the control circuit 304 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)).

In some embodiments, the locker 302 includes a communications device 308. The communications device 308 may allow communication between the locker 302 and the backend 312 and, in some embodiments, the locker 302 and the docking station 314. The communications device 308 can be wired or wireless. Additionally, the docking station 314 and the backend 312 can communicate. In some embodiments, a person can rent or reserve the locker 302 online before going to the docking station 314. In such embodiments, the backend 312 can provide information about the person and the rental or reservation to the docking station 314. For example, the backend 312 can transmit an indication of the person's identity or user account, payment information, reservation details, etc. to the docking station 314.

In some embodiments, the locker 302 also includes a propulsion unit and a battery 306. In such embodiments, the propulsion unit and battery 306 can allow the locker 302 to move with little or no effort, as described above. Additionally, in some embodiments, the locker 302 can include a network adapter 310. The network adapter 310 can provide connectivity, such as Wi-Fi connectivity, to a person using the locker 302.

Figure 4:
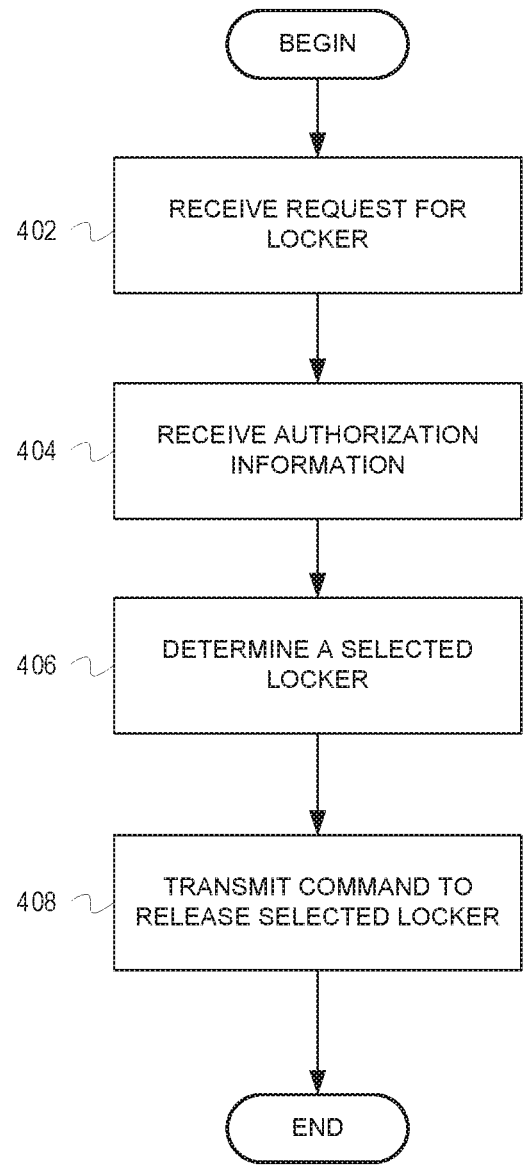
FIG. 4 is a flow diagram of example operations for releasing a locker from a docking station, according to some embodiments.

While the discussion of FIG. 3 provides greater detail about a system including a locker and a docking station, the discussion of FIG. 4 provides greater detail about releasing a locker from a docking station.

FIG. 4 is a flow diagram of example operations for releasing a locker from a docking station, according to some embodiments. The flow begins at block 402.

At block 402, a request for a locker is received. The request for the locker can be received at the docking station (e.g., via user input at a control unit) or at a backend (e.g., a backend server). For example, a person can request (i.e., rent or reserve) a locker at the docking station and/or online before going to the docking station via a computer or mobile device. In some embodiments, the backend can store user account information (e.g., user identities, payment information, etc.). In such embodiments, a person can log in to their account via the backend and request a locker. The flow continues at block 404.

At block 404, authorization information is received. For example, the docking station or the backend can receive the authorization information. The authorization information can be an indication that the person requesting the locker is authorized to receive the locker. For example, the authorization information can indicate that the person is a member of a service associated with the locker system or that the person has paid to rent or reserve the locker. In embodiments in which the person requests a locker at the docking station, the authorization information can be received at the docking station via a control unit or other input device or payment mechanism. In embodiments in which the person has requested a locker remotely, the backend can provide the authorization information to the docking station. The flow continues at block 406.

At block 406, a selected locker is determined. For example, the docking station or the backend can determine a selected locker. In some embodiments, all of the lockers at the docking station are the same or similar and the locker can be selected automatically for the person. For example, the docking station or backend can select a locker based on a rotation plan (e.g., to try to maintain similar usage of all lockers at the docking station), based on known problems with lockers (e.g., not select lockers that are known to be broken or damaged), or any other suitable scheme. In other embodiments, some or all of the lockers at the docking station may be different from each other. For example, the lockers may be different sizes, have different capabilities, be available to different groups of people, etc. In such embodiments, the docking station or the backend can select a locker based on the person's needs or group membership. For example, if the person is going to transport perishable items in the locker, the docking station or backend can select a locker that includes a condition control device and that has sufficient power (e.g., a battery level) sufficient to meet the person's needs. Additionally, or alternatively, the person can select a locker at the time of the request or at the time of retrieval. The person can select a locker by simply removing a locker, entering a code at the docking station, or entering a selection at the docking station. The flow continues at block 408.

At block 408, a command is transmitted to release the selected locker. The command can be transmitted by the docking station to a securement mechanism associated with the selected locker. In some embodiments, a command is transmitted from the backend to the docking station before the docking station transmits the command to the securement mechanism. Once released, the person can use the locker for any suitable term. For example, the person can use the locker for a set time period or an unlimited time period. Additionally, in some embodiments, the person can select a term. In such embodiments, different terms may have different requirements, such as different costs, different subscription levels, different memberships, etc. Additionally, as previously discussed, in some embodiments the lockers may be privately owned and stored at the docking station.

In some embodiments, a system comprises a docking station, the docking station configured to selectively secure and release one or more lockers and receive a command to allow one of the one or more lockers to be released, wherein each of the one or more lockers is removable from the docking station, and wherein each of the one or more lockers comprises a storage portion and a securement mechanism for securing each of the one or more lockers to the docking station.

In some embodiments, a method comprises receiving, at a docking station housing one or more lockers, a request for a locker, receiving, at the docking station, authorization information for a user, determining, by the docking station, a selected locker from the one or more lockers, and transmitting, by the docking station to a securement mechanism associated with the selected locker, a command to allow the selected locker to be released from the docking station.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system for selectively securing and releasing lockers, the system comprising:
   a docking station, wherein the docking station is configured to:
      selectively secure and release one or more lockers; and
      receive, from a mobile device, a command to allow one of the one or more lockers to be released;
   the one or more lockers, wherein each of the one or more lockers is removable from the docking station, and wherein each of the one or more lockers comprises:

a storage portion, wherein the storage portion is configured to receive, from a user, one or more items;
a door, wherein the door is configured to provide access for a person to the storage portion; and
a securement mechanism, wherein the securement mechanism is configured to secure each of the one or more lockers to the docking station, and wherein the securement mechanism is configured to receive commands to release each of the one or more lockers from the docking station.

2. The system of claim 1, further comprising the mobile device, wherein the mobile device is configured to:
receive, from the person, a command to rent a locker; and
transmit, to the docking station, the command to allow one of the one or more lockers to be released.

3. The system of claim 1, wherein the command to allow one or more of the lockers to be released is received from the mobile device via a backend server.

4. The system of claim 1, wherein the docking station is further configured to:
in response to receipt of a command to release a first locker of the one or more lockers, transmit, to a securement mechanism associated with the first locker, and instruction to release the first locker.

5. The system of claim 1, wherein each of the one or more lockers further comprise:
a validation mechanism for allowing access to an associated one of the one or more lockers.

6. The system of claim 5, wherein the validation mechanism is one or more of an NFC reader, a biometric scanner, and a keypad.

7. The system of claim 5, wherein each of the one or more lockers includes a handle, and wherein the validation mechanism of each of the one or more lockers is located in the handle of each of the one or more lockers.

8. The system of claim 1, wherein the command to allow one or more of the lockers to be released includes payment information.

9. The system of claim 1, wherein each of the one or more lockers further comprise:
a propulsion unit; and
one or more controls configured to actuate the propulsion unit.

10. The system of claim 1, wherein the docking station is further configured to:
provide electrical power to the one or more lockers.

11. A method for selectively securing and releasing lockers, the method comprising:
receiving, at a docking station housing one or more lockers from a backend server, a request for a locker, wherein the request originates from a mobile device, wherein each of the one or more lockers includes a storage portion and a door, wherein the storage portion is configured to receive one or more items, and wherein the door is configured to provide access to the storage portion:
receiving, at the docking station from the backend server, authorization information for a person;
receiving, at the docking station, an indication of a selected locker from the one or more lockers; and
transmitting, to a securement mechanism associated with the selected locker, a command to allow the selected locker to be released from the docking station.

12. The method of claim 11, wherein the request for a locker originates from a mobile device.

13. The method of claim 11, wherein the authorization information for the person originates from a mobile device.

14. The method of claim 11, wherein the indication of the selected locker is received from the mobile device.

15. The method of claim 14, wherein the indication of the selected locker is received from the mobile device via the backend server.

16. The method of claim 11, further comprising:
receiving, at a validation mechanism of the selected locker, validation information, wherein the validation information allows access to a storage portion of the selected locker.

17. The method of claim 16, wherein the validation mechanism is one or more of an NFC reader, a biometric scanner, and a keypad.

18. The method of claim 16, wherein the selected locker includes a handle, and wherein the validation mechanism is located in the handle.

19. The method of claim 11, further comprising:
providing, by the docking station, electrical power to the one or more lockers.

* * * * *